(12) United States Patent
Shepelev et al.

(10) Patent No.: US 9,442,598 B2
(45) Date of Patent: Sep. 13, 2016

(54) DETECTING INTERFERENCE IN AN INPUT DEVICE HAVING ELECTRODES

(71) Applicant: Synaptics Incorporated, Santa Clara, TX (US)

(72) Inventors: Petr Shepelev, San Jose, CA (US); Farzaneh Shahrokhi, San Jose, CA (US); Murat Ozbas, Rochester, NY (US); Tracy Scott Dattalo, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 238 days.

(21) Appl. No.: 13/763,368

(22) Filed: Feb. 8, 2013

(65) Prior Publication Data

US 2014/0225856 A1 Aug. 14, 2014

(51) Int. Cl.
G06F 3/041 (2006.01)
G06F 3/046 (2006.01)
G06F 3/044 (2006.01)

(52) U.S. Cl.
CPC ............. G06F 3/0418 (2013.01); G06F 3/044 (2013.01); G06F 3/046 (2013.01)

(58) Field of Classification Search
CPC ...... G06F 3/041; G06F 3/0418; G06F 3/046; G06F 3/044
USPC ........................................................ 345/174
See application file for complete search history.

(56) References Cited

U.S. PATENT DOCUMENTS

| | | | | |
|---|---|---|---|---|
| 5,327,163 A * | 7/1994 | Hashimoto | ........... | G06F 3/0412 178/18.05 |
| 5,392,058 A * | 2/1995 | Tagawa | ................ | B25J 19/0012 345/103 |
| 5,736,980 A * | 4/1998 | Iguchi et al. | ................. | 345/179 |
| 6,075,520 A * | 6/2000 | Inoue | ...................... | G06F 3/044 178/18.01 |
| 6,236,386 B1 * | 5/2001 | Watanabe | ........................ | 345/98 |
| 6,278,445 B1 * | 8/2001 | Tanaka et al. | ................ | 345/178 |
| 6,476,798 B1 * | 11/2002 | Bertram et al. | .............. | 345/174 |
| 7,643,011 B2 | 1/2010 | O'Connor et al. | | |
| 8,294,687 B1 * | 10/2012 | Ksondzyk | ...................... | 345/173 |
| 8,400,422 B2 * | 3/2013 | Chang | ................... | G06F 3/0416 345/173 |
| 8,514,191 B2 * | 8/2013 | Wang | ...................... | G06F 3/044 345/173 |
| 2003/0210235 A1 * | 11/2003 | Roberts | ................. | G06F 3/0414 345/173 |
| 2004/0094338 A1 * | 5/2004 | Skurnik | .................. | G06F 3/041 178/18.01 |
| 2005/0088406 A1 * | 4/2005 | Chang et al. | ................. | 345/156 |
| 2008/0309625 A1 | 12/2008 | Krah et al. | | |
| 2008/0309628 A1 | 12/2008 | Krah et al. | | |
| 2010/0060589 A1 | 3/2010 | Wilson | | |

(Continued)

*Primary Examiner* — Claire X Pappas
*Assistant Examiner* — Robert Stone
(74) *Attorney, Agent, or Firm* — Osha Liang LLP

(57) ABSTRACT

A method for detecting interference in an input device, the method involving: driving a transmitter signal onto a transmitter sensor electrode of the input device; receiving a resulting signal from a receiver sensor electrode of the input device; sampling a first value associated with the resulting signal during a first half of a sensing cycle; sampling a second value associated with the resulting signal during a second half of the sensing cycle; generating an interference value based on the first value and the second value; determining, based on the first value and the second value, an input in a sensing region of the input device; and comparing the interference value to a noise threshold.

17 Claims, 5 Drawing Sheets

(56) References Cited

U.S. PATENT DOCUMENTS

| | | | |
|---|---|---|---|
| 2010/0060610 A1* | 3/2010 | Wu | 345/174 |
| 2010/0188356 A1* | 7/2010 | Vu et al. | 345/173 |
| 2010/0301879 A1* | 12/2010 | Philipp | G06F 3/03547 |
| | | | 324/679 |
| 2011/0050634 A1* | 3/2011 | Lin | G06F 3/0416 |
| | | | 345/174 |
| 2011/0102061 A1* | 5/2011 | Wang et al. | 327/517 |
| 2011/0109585 A1* | 5/2011 | Kwon et al. | 345/174 |
| 2011/0115724 A1* | 5/2011 | Jeon | G06F 3/042 |
| | | | 345/173 |
| 2011/0134076 A1* | 6/2011 | Kida | G06F 3/0412 |
| | | | 345/174 |
| 2011/0210939 A1* | 9/2011 | Reynolds | G06F 3/0418 |
| | | | 345/174 |
| 2011/0242048 A1* | 10/2011 | Guedon et al. | 345/174 |
| 2012/0139870 A1* | 6/2012 | Beyly | G06F 3/0416 |
| | | | 345/174 |
| 2012/0206154 A1* | 8/2012 | Pant et al. | 324/613 |
| 2012/0229415 A1* | 9/2012 | Schwartz et al. | 345/174 |
| 2014/0009431 A1* | 1/2014 | Kwon, II | G06F 3/044 |
| | | | 345/174 |
| 2014/0225856 A1* | 8/2014 | Shepelev | G06F 3/0418 |
| | | | 345/174 |

* cited by examiner

DETECTING INTERFERENCE IN AN INPUT DEVICE HAVING ELECTRODES

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a method for detecting interference in an input device. The method comprises: driving a transmitter signal onto a transmitter sensor electrode of the input device; receiving a resulting signal from a receiver sensor electrode of the input device; sampling a first value associated with the resulting signal during a first half of a sensing cycle; sampling a second value associated with the resulting signal during a second half of the sensing cycle; generating an interference value based on the first value and the second value; determining, based on the first value and the second value, an input in a sensing region of the input device; and comparing the interference value to a noise threshold.

In general, in one aspect, the invention relates to an input device configured to sense input objects in a sensing region. The input device comprises: transmitter circuitry configured to drive a transmitter signal onto a transmitter sensor electrode of an input device, wherein the transmitter signal comprises a transmitter waveform with repeating cycles, and wherein each cycle comprises a transition; receiver circuitry configured to receive a resulting signal from a receiver sensor electrode of the input device, the receiver circuitry comprising: accumulator circuitry comprising an amplifier and configured to: accumulate a first value of the resulting signal during a first half of a sensing cycle; and accumulate a second value of the resulting signal during a second half of the sensing cycle; and demodulator circuitry configured to: determine an input from the sensing region of the input device based on the first value and the second value; and generate an interference value based on the first value and the second value; control circuitry comprising a first comparator and configured to: generate, using the first comparator, a first comparison of the interference value and noise threshold.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
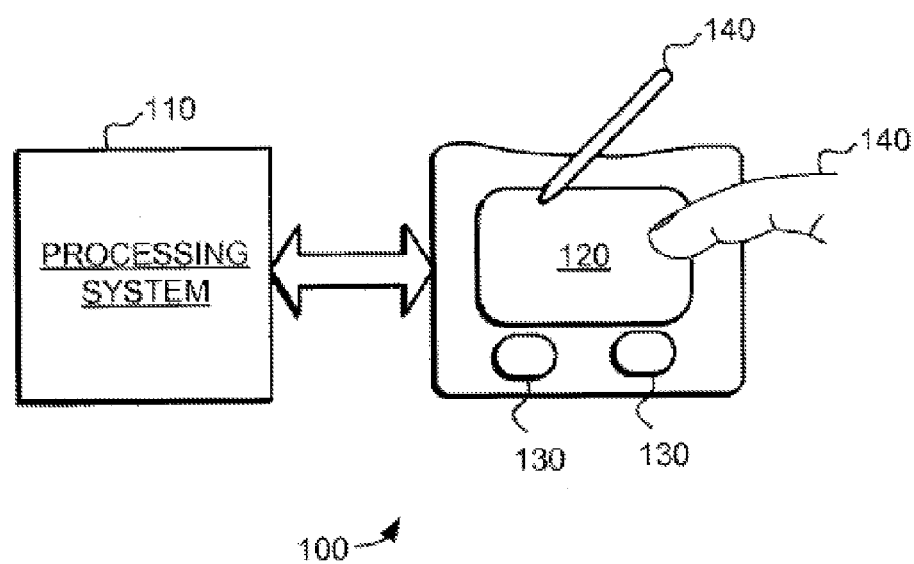
FIG. 1 is a block diagram of an exemplary input device in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) can be implemented as a physical part of the electronic system, or can be physically separate from the electronic system. As appropriate, the input device (100) may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some capacitive implementations utilize both transcapacitance and absolute capacitance sensing methods. In other words, some capacitive implementations are a hybrid of transcapacitance and absolute capacitance sensing methods based on changes in the capacitive coupling between sensor electrodes and between sensor electrodes and an input object.

In FIG. 1, a processing system (110) is shown as part of the input device (100). The processing system (110) is configured to operate the hardware of the input device (100) to detect input in the sensing region (120). The processing system (110) comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system (110) also comprises electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may comprise software configured to run on a central processing unit of the desktop computer and one or more ICs (perhaps with associated firmware) separate from the central processing unit. As another example, the input device (100) may be physically integrated in a phone, and the processing system (110) may comprise circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may comprise circuitry that is a part of the processing system (110), firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as GUI actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that can be used to facilitate selection of items using the input device (100). Other types of additional input components include sliders, balls, wheels, switches, and the like. Conversely, in some embodiments, the input device (100) may be implemented with no other input components.

In some embodiments, the input device (100) comprises a touch screen interface, and the sensing region (120) overlaps at least part of an active area of a display screen. For example, the input device (100) may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system (110).

In general, embodiments of the invention provide a system and method for operating an input device. Furthermore, embodiments of the invention provide a system and method for detecting interference in an input device. Specifically, a transmitter signal is driven onto a sensor electrode in a sensing region of the input device and a resulting signal is received from a sensor electrode in the sensing region. The resulting signal is a function of the transmitter signal, user input (if any) in the sensing region, and one or more types of interference and noise. The resulting signal is monitored over multiple sensing cycles and a sample value associated with the resulting signal is collected during each half of a sensing cycle. An interference value indicative of interference during a sensing cycle (or a portion thereof) may be generated based on the two samples collected during the sensing cycle. Further, the user input during the sensing cycle may be determined based on the two samples collected during the sensing cycle. Further still, if the interference value exceeds a threshold, the sampled values and any determination of user input may in the sensing region be flagged as potentially corrupted or invalid.

Figure 2:
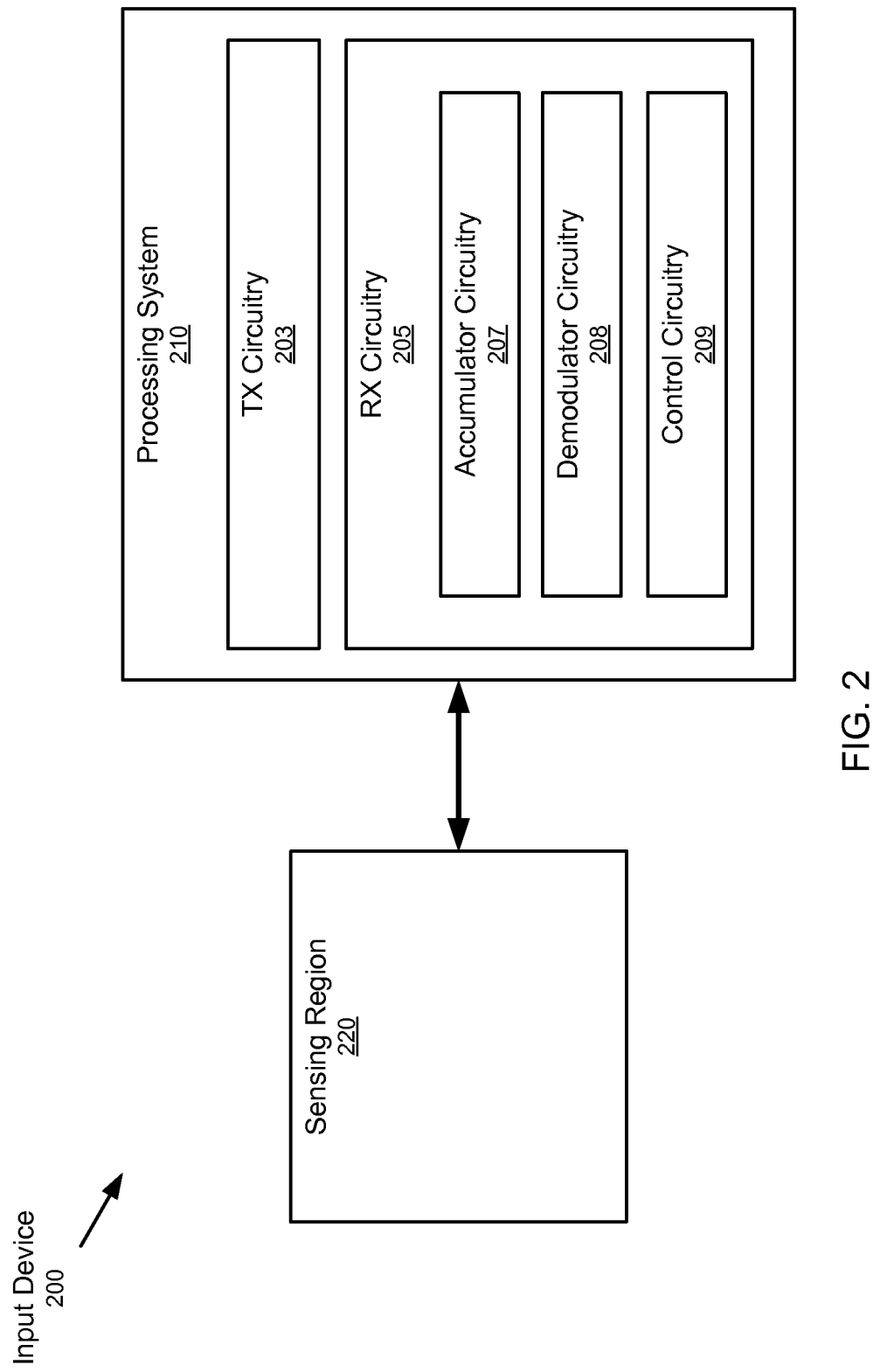
FIG. 2 is a block diagram of an input device in accordance with one or more embodiments of the invention.

FIG. 2 shows an input device (200) in accordance with one or more embodiments of the invention. As shown in FIG. 2, the input device (200) includes a sensing region (220) and a processing system (210). The sensing region (220) and the processing system (210) may be essentially the same as the sensing region (120) and the processing system (110), discussed above in reference to FIG. 1. As also shown in FIG. 2, the processing system (210) comprises transmitter circuitry (203) and receiver circuitry (205). The receiver circuitry (205) comprises accumulator circuitry (207), demodulator circuitry (208) and control circuitry (209). Each of these components (203, 205, 207, 208, and 209) is discussed below.

In one or more embodiments of the invention, the input device (200) includes transmitter circuitry (203) and receiver circuitry (205). The transmitter circuitry (203) is configured to drive a transmitter signal ($V_{TX}$) onto a transmitter sensor electrode of the sensing region (220). The transmitter signal may be a square wave, a sinusoidal wave, or any type of signal with repeating cycles, where each cycle of the transmitter signal includes a transition. The receiver circuitry (205) is configured to receive a resulting signal from a receiver sensor electrode of the sensing region (220). The resulting signal is a function of: (i) the transmitter signal; (ii) user input (if any) in the sensing region (220); and (iii) one or more types of interference and/or noise from a variety of sources. The transmitter circuitry (203) and the receiver circuitry (205) may be components of the processing system (110), discussed above in reference to FIG. 1.

In one or more embodiments of the invention, the receiver circuitry (205) of the input device (200) includes accumulator circuitry (207). As discussed above, the resulting signal is monitored over multiple sensing cycles corresponding to the sensing cycles of the transmitter signal ($V_{TX}$). At approximately the start of each half cycle, the accumulator circuitry (207) is reset. Following the reset, the accumulator circuitry (207) accumulates values corresponding to the resulting signal until the next reset. Accordingly, the output of the accumulator circuitry (207) at a given time may represent the charge accumulated from the resulting signal since the last reset. The accumulator circuitry (207) may include an operational amplifier configured to accumulate the charge received by the receiver sensor electrode. For example, in one embodiment the accumulator circuitry (207) is reset and begins accumulating a charge at the start of a first transition of a transmitter signal. The accumulator circuitry (207) accumulates the charge associated with the resulting signal received on a receiver sensor electrode until the start of a second transition of the transmitter signal.

In one or more embodiments of the invention, the output ($V_{ACC}$) of the accumulator circuitry (207) is sampled at the end of each half cycle of the transmitter signal, prior to the accumulator circuitry (207) being reset. Accordingly, two sample values are collected for each sensing cycle, one value per half cycle of the transmitter signal. The sampled values may be stored in capacitors operatively connected to the accumulator circuitry (207). The capacitors storing the sample values may be circuit elements in the accumulator circuitry (207), or may be circuit elements of a different component of the receiver circuitry (205) such as the demodulator circuitry (208).

In one or more embodiments of the invention, the input device (200) is configured to: (i) generate an interference value for a sensing cycle based on the two sample values collected during the sensing cycle; (ii) determine an input (i.e., user input) in the sensing region (220) based on the two sample values collected during the sensing cycle; and (iii) compare the interference value with an noise threshold ($V_{NTH}$). In one or more embodiments of the invention, the interference value is generated by demodulation circuitry (208) based on a summation of the two sampled values (if the two sampled values are of opposite polarity). The summation may be performed by operatively connecting capacitors storing the two sample values. In one or more embodiments of the invention, the user input is determined by at least taking a difference between the two samples values (if the two sampled values are of opposite polarity). The difference may be calculated by operatively connecting capacitors storing the two sample values. In one or more embodiments of the invention, the control circuitry (209) includes a comparator for comparing the calculated interference value with a noise threshold.

In one or more embodiments of the invention, if the generated interference value exceeds the noise threshold, this is indicative that non-trivial asymmetric interference was present during at least a part of the sensing cycle, and that the determined user input may be corrupted, distorted, or invalid. In such embodiments, the control circuitry (209) may issue a flag corresponding to the presence of such an interferer. The flag may be relied upon by other components of the processing system (210), such as an analog-to-digital converter (ADC) or filter (not shown) to ignore/discard the flagged determined user input and/or invoke one or more interference avoidance actions or countermeasures.

In one or more embodiments of the invention, the control circuitry (209) is further configured to compare one or more of the sampled values with a rail voltage range of an amplifier in the accumulator circuitry (207). If railing or clipping of the amplifier has occurred, the control circuitry (209) may issue a flag for the sampled values. The control circuitry (209) may use parts of the same circuitry (e.g., a comparator) to detect both voltage railing and interference.

Although the discussion of FIG. 2 has focused on an input device (220) that implements transcapacitance sensing, the input device (220) may also implement absolute capacitance sensing or a hybrid of transcapacitance sensing and absolute capacitance sensing. In the embodiments involving only absolute capacitance sensing, there is no transmitter signal and thus the transmitter circuitry (203) may be omitted. Instead, in the embodiments involving absolute capacitance sensing, the receiver circuitry (205) may established the drive signal. However, the output ($V_{ACC}$) of the accumulator circuitry (207) may still be used to generate an interference value for a sensing interval based on the two sample values collected during the sensing interval; and determine an input (i.e., user input) in the sensing region (220) based on the two sample values collected during the sensing interval. Moreover, in the embodiments involving absolute capacitance sensing, the control circuitry (209) may still issue a flag when interference and/or voltage railing is detected.

Figure 3:
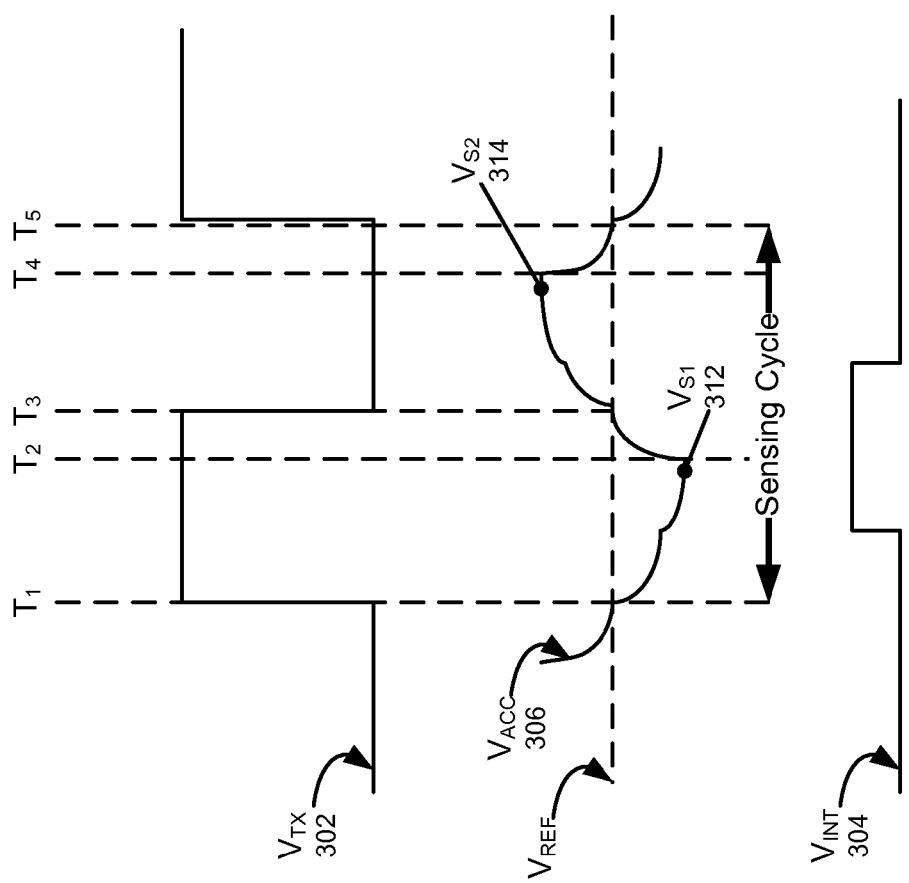
FIG. 3 is a timing diagram in accordance with one or more embodiments of the invention.

FIG. 3 shows an example timing diagram in accordance with one or more embodiments of the invention. The timing diagram shown in FIG. 3 may correspond to the example circuitry discussed below in reference to FIG. 4. FIG. 3 shows the transmitter signal ($V_{TX}$) (302), asymmetric interference/noise ($V_{INT}$) (304), and the output of the accumulator circuitry ($V_{ACC}$) (306). The output of the accumulator circuitry ($V_{ACC}$ (306)) is used to determine user input in the sensing region (220) of the input device (200). The presence of interference may corrupt the measurement of user input if the interferer impacts the measurement in a similar fashion as a valid input in the sensing region. The embodiments of the present invention enable a detection of interference and user input in a sensing region.

As shown in FIG. 3, the transmitter signal ($V_{TX}$) (302) is a square wave with repeating cycles. Each cycle may include a first transition and a second transition. In the example, the transmitter signal switches between two voltages, with the signal transitioning twice per period. For purposes of this discussion, assume that a first transition occurs at time $T_1$, where the transition is from a low to high voltage, and a second transition occurs at time $T_3$, where the transition is from a high to low voltage, although, in most cases the designation of a "first transition" and a "second transition" is arbitrary.

As also shown in FIG. 3, the output of the accumulator circuitry ($V_{ACC}$) (306) is monitored over multiple sensing cycles. The time interval between $T_1$ and $T_5$ represents a sensing cycle. $T_3$ partitions the sensing cycle into two halves: one half having a positive polarity, one half having a negative polarity. In this example, an initial accumulation of the resulting signal begins at or shortly after the first transition $T_1$, and ends at approximately time $T_2$. Similarly, a subsequent accumulation of the resulting signal begins at or shortly after time $T_3$, and ends approximately at time $T_4$. During the time interval between $T_2$ and $T_3$, and the time interval between $T_4$ and $T_5$, the accumulator circuitry (407) is reset and $V_{ACC}$ follows $V_{REF}$.

Still referring to FIG. 3, the sample value $V_{S1}$ (312) is collected during the first half of the sensing cycle, while the sample value $V_{S2}$ (314) is collected during the second half of the sensing cycle. Both sample values (312, 314) are collected just prior to $T_2$ and $T_4$, and the resetting of the accumulator circuitry. This provides a maximum amount of time for the accumulation to settle prior to sampling.

In one or more embodiments of the invention, $V_{INT}$ (304) is an example of noise. Specifically, $V_{INT}$ (304) is not uniform over the entire sensing cycle and affects the two sampled values (312, 314) differently. In the example shown, $V_{INT}$ (304) is asymmetric as it effects the measurement of $V_{S1}$ (312) but does not effect the measurement of $V_{S2}$ (314). As shown in FIG. 3, assume the user input component in $V_{ACC}$ (306) is proportional to $\Delta V$, such that in the absence of any interference, $\Delta V$ is an uncorrupted measurement of any user activity in the sensing region. Thus, $V_{S1}$ (312) may be approximated as $V_{S1}=V_{REF}+\Delta V_1+V_{INT}$. Further, $V_{S2}$ (314) may be approximated as $V_{S2}=V_{REF}+\Delta V_2$. For simplicity and clarity, let's assume that $V_{REF}=0$, thus $V_{S1}=\Delta V_1+V_{INT}$ and $V_{S2}=\Delta V_2$.

In general, the user input component may be determined from the sampled values. Specifically, the user input component may be determined by subtracting $V_{S2}$ (314) from $V_{S1}$ (312). As a result, measured input, sometimes referred to as the demodulated output ($V_{demod}$) is proportional to $\Delta V_1+V_{INT}-\Delta V_2$. The demodulated output is then compared to a baseline value (e.g., previous measurements which did not contain any input in the sensing regions) to determine if the measured input is indicative of an input object in the sensing region. If the measured input is significantly different from the baseline value, it can be determined that some activity in the sensing region has occurred. The presence of an interferer or noise in the sensing region (as defined by $V_{INT}$, in this example) in the absence of any input object in the sensing region may trigger a false determination that a valid input object is in the sensing region. This may most likely occur because the presence of $V_{INT}$ in the demodulated output is very similar to a change in the demodulated output due to an input object (i.e. the additional change in signal with respect to the baseline due to $V_{INT}$ may similar to the presence of an input object). In other words, the demodulated user input may be corrupted by an asymmetric interference/noise component.

To increase the robustness of the input device and reliably determine valid input in the sensing region, an interference value may be generated from the sampled values in order to determine the validity of any measured input due to the presence of noise. Specifically, the interference value may be calculated by summing the two sampled values (312, 314): |interference value|=|VS1+VS2|=$V_{INT}$. The calculated interference value is representative of any asymmetry between the first and second half sampled values. If the calculated interference value exceeds a noise threshold, this indicates that the demodulated user input from the same sensing cycle may be corrupted by asymmetric interference/noise. Accordingly, the demodulated user input from the sensing cycle may be flagged.

In one or more embodiments of the invention, both $V_{S1}$ (312) and $V_{S2}$ (314) may be compared with a rail voltage range of the operational amplifier (454) in the accumulator circuitry (407). If either sampled value (312, 314) approaches either a positive or negative rail voltage (i.e., a rail voltage range), the demodulated user input may also be flagged as invalid, corrupt, etc. The rail voltage range may be a fixed or modulated voltage, such as a percentage of the absolute rail voltages of the amplifier.

Figure 4:
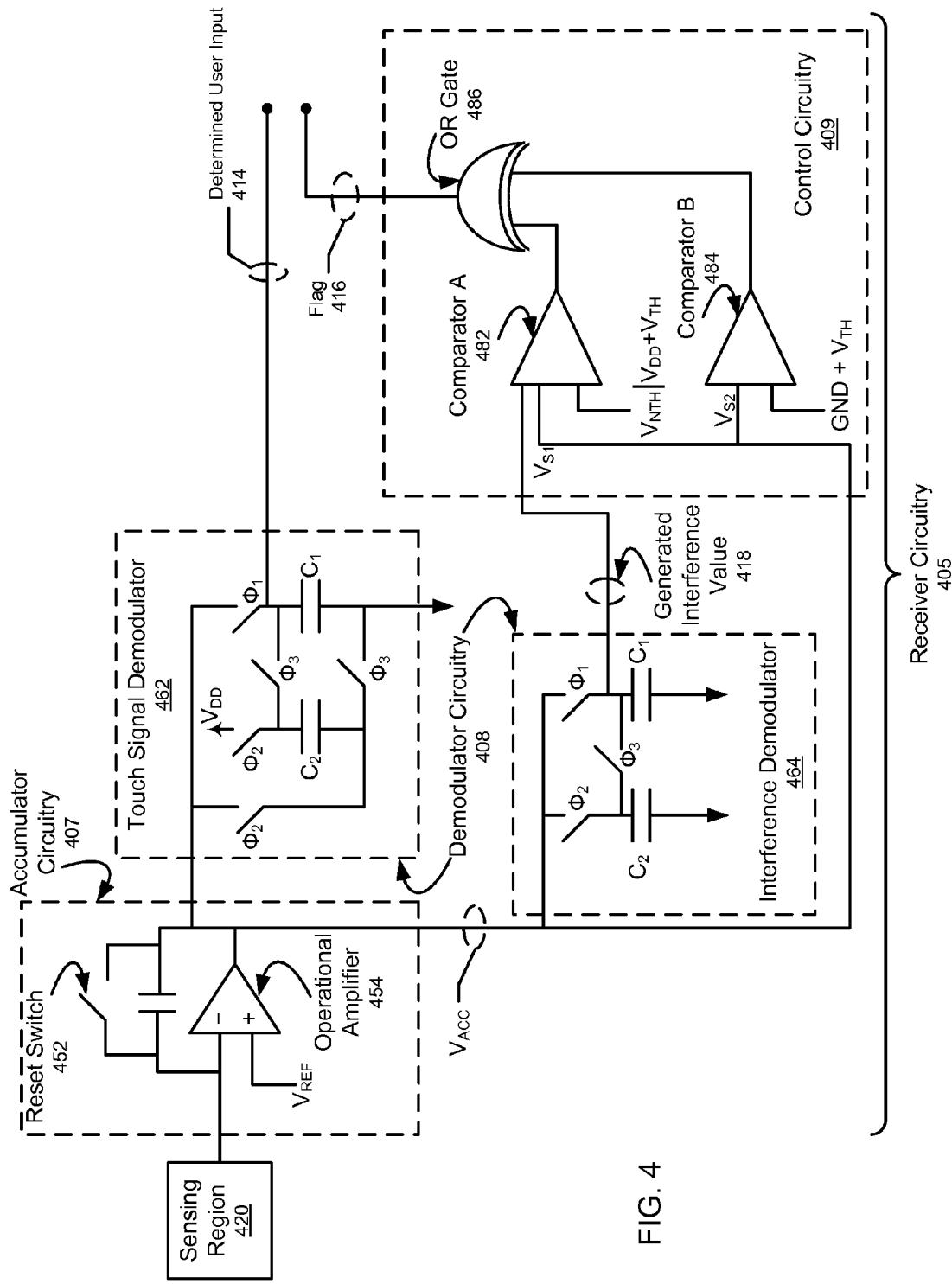
FIG. 4 is example circuitry in accordance with one or more embodiments of the invention.

FIG. 4 shows an example in accordance with one or more embodiments of the invention. As shown in FIG. 4, transmitter circuitry (not shown) is configured to drive a sensing signal onto at least one sensor electrode overlapping the sensing region (420). The receiver circuitry (405) is configure to measure a capacitive coupling between the at least one sensor electrode overlapping the sensing region and at least one other sensor electrode overlapping the sensing region. In one embodiment, the receiver circuitry (405) comprises accumulator circuitry (407), demodulator circuitry (408) and control circuitry (409). The transmitter circuitry (not shown), the receiver circuitry (405), and the sensing region (420) may correspond to the transmitter circuitry (203), the receiver circuitry (205), and the sensing region (220), discussed above in reference to FIG. 2. The accumulator circuitry (407), demodulator circuitry (408) and the control circuitry (409) are example implementations of the accumulator circuitry (207), demodulator circuitry (208) and the control circuitry (209), discussed above in reference to FIG. 2.

In one or more embodiments of the invention, the accumulator circuitry (407) includes an operational amplifier (454). A reference voltage ($V_{REF}$) is applied to the non-inverting input of the operational amplifier (454), while a sensor electrode is ohmically coupled to the inverting input of the operational amplifier (454). The operational amplifier (454) includes a feedback circuit with a reset switch (452). The reset switch (452) is used to reset the accumulator circuitry (407) at approximately the start of each half of a sensing cycle. The output of the operational amplifier (454) ($V_{ACC}$) represents the charge accumulated by the operational amplifier (454) from the ohmically coupled sensor electrode since the last reset. Those skilled in the art, having the benefit of this detailed description, will appreciate that the output of the operational amplifier (454) will follow $V_{REF}$ in response to application of the reset switch (452).

In one or more embodiments of the invention, the receiver circuitry (405) includes demodulator circuitry (408). The demodulator circuitry (408) may include a touch signal demodulator (462) and an interference demodulator (464). In the embodiment shown in FIG. 4, the touch signal demodulator (462) includes various capacitors and switches to sample and store the two values ($V_{S1}$, $V_{S2}$) of $V_{ACC}$ during each sensing cycle.

In the embodiment shown in FIG. 4, a first capacitor may be used to store a first sample, such as value $V_{S1}$ corresponding to the first half of the sensing cycle, and a second capacitor is used to store a second sample value, such as value $V_{S2}$, corresponding to the second half of the sensing cycle. The demodulated user input may be determined by a summation of both sampled values. In the embodiment of the touch signal demodulator (462) shown in FIG. 4, the first sampled value $V_{S1}$, is stored in capacitor $C_1$ and the second sampled value $V_{S2}$, is stored in capacitor $C_2$. The stored second sample value stored in capacitor $C_2$ is flipped to enable the summation of the sampled values by connecting the capacitors $C_1$ and $C_2$ is parallel. Thus, by operatively connecting the capacitors in the touch signal demodulator (462), the demodulated user input (414) represented in Eq. 1:

$$V_{input}^{demod} \propto |V_{S1}-V_{S2}| \qquad \text{(Eq. 1)}$$

Since the sampled values $V_{S1}$ and $V_{S2}$ are of opposite polarities, subtracting them represents a the summation of the magnitudes of the values $V_{S1}$ and $V_{S2}$, which is used by the processing system (210) to determine input to the sensing region (420).

Similarly, the interference demodulator circuitry (464) includes various capacitors and switches to sample and store two values ($V_{S1}$, $V_{S2}$) of $V_{ACC}$ during each sensing cycle. A first capacitor may be used to store a first sample, such as value $V_{S1}$ corresponding to the first half of the sensing cycle, and a second capacitor is used to store a second sample value, such as value $V_{S2}$, corresponding to the second half of the sensing cycle. If the sampled values are of opposite polarities, the interference demodulator (464) may calculate an interference value (418) by summing the sample values. In the embodiment of the interference demodulator (464) shown in FIG. 4, the first sampled value $V_{S1}$ is stored in capacitor $C_1$ and the second sampled value $V_{S2}$, is stored in capacitor $C_2$. Unlike the capacitor $C_2$ of the touch signal demodulator circuitry, the capacitor $C_2$ of the interference demodulator circuitry is not flipped. Thus, by connecting capacitors $C_1$ and $C_2$ in parallel, the sample values stored in the capacitors are subtracted, resulting in a difference of the magnitudes of the two sampled values. The output of the interference demodulator circuitry (464) represents a difference in the magnitudes of the values $V_{S1}$ and $V_{S2}$, and represent the generated interference value (418). The generated interference value (418) and can be to enable detection of interference by the processing system (110).

In one or more embodiments, the receiver circuitry (405) includes control circuitry (409) configured to determine a presence of and/or level of present interference in the resulting signal based on the two sampled values ($V_{S1}$, $V_{S2}$), the generated interference value (418) and/or the demodulated user input (414). The determination may include issuing a flag (416) to other components of the receiver circuitry (409), such as an ADC (Analog to Digital converter) or signal filtering component, and other components of the processing system (210), such as the firmware and software or transmitter circuitry. In one embodiment, the receiver circuitry may determine the presence of interference using control circuitry (409) including Comparator A (482) and Comparator B (484). Comparator B (484) may compare the second sampled value ($V_{S2}$) with the approximate rail voltage (or some acceptable range) of the operational amplifier (454). Comparator A (482) may compare the first sampled value ($V_{S1}$) with the approximate rail voltage (or some acceptable range) of the operational amplifier (454). Either Comparator A (482), comparator B (484) or other similar circuitry may also compare the calculated interference value (418) with a noise threshold ($V_{NTH}$). The output of comparator A (482) and the output of comparator B (484) in either operation may be applied to the inputs of an OR gate (486). The control circuitry (409) may output a flag (416) if either sampled values ($V_{S1}$, $V_{S2}$) were accumulated during a saturation or overload of the operational amplifier (454) and/or if any significant noise was present in the sensing region during each half sensing cycle. As discussed above, the flag may be issued in response to the calculated interference value (418) exceeding the noise threshold ($V_{NTH}$) and/or one or more of the sampled values ($V_{S1}$, $V_{S2}$) approaching the rail voltage. The flag may be relied upon by other components, such as an analog-to-digital converter (ADC), to ignore/discard the flagged demodulated user input and/or invoke one or more interference avoidance actions, such as changing the sensing frequency or filtering operations.

Figure 5:
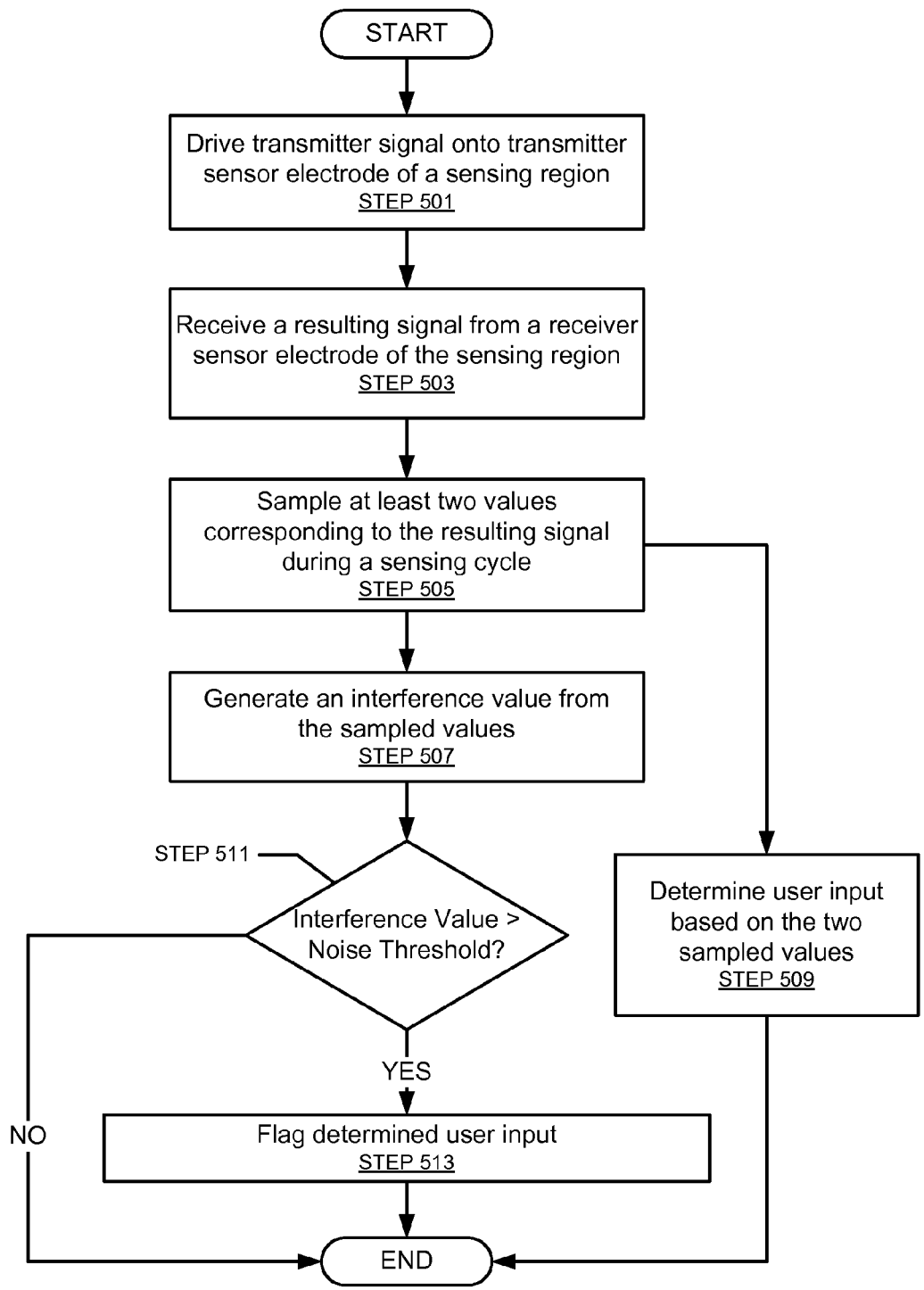
FIG. 5 is a flowchart in accordance with one or more embodiments of the invention.

FIG. 5 shows a flowchart describing a method detecting interference in an input device accordance with one or more embodiments of the invention. The process shown in FIG. 5 may be used by the processing system (110/210) to operate the input device 100. One or more steps shown in FIG. 5 may be omitted, repeated, and/or performed in a different order among different embodiments of the invention. Accordingly, embodiments of the invention should not be considered limited to the specific number and arrangement of steps shown in FIG. 5.

Initially in STEP 501, a transmitter signal is driven onto a transmitter sensor electrode using transmitter circuitry (203). The transmitter signal may be a square wave, a sinusoidal wave, or any type of signal having cycles, where each cycle includes a transition.

In STEP 503, a resulting signal is received from a receiver sensor electrode of the input device by receiver circuitry (205). The resulting signal is a function of: (i) the transmitter signal; (ii) user input (or lack thereof) in the sensing region of the input device; and (iii) one or more types of interference/noise from a variety of sources.

As discussed above, the resulting signal may be monitored over multiple sensing cycles. As also discussed above, accumulator circuitry of the receiver circuitry (205) may accumulate different portions of the resulting signal by using an integrating amplifier. In STEP 505, two values accumulated by the accumulator circuitry and corresponding to the resulting signal are sampled during each cycle. Specifically, one sampled value is collected corresponding to the beginning half of a sensing cycle, while the other sampled value is collected corresponding to the last half of the sensing cycle.

In STEP 507, an interference value is generated from the two sampled values. The interference value may be proportional to an asymmetry in magnitude between of the two sampled values.

In STEP 509, the user input for the sensing cycle is determined/demodulated from the two sampled values. The user input for the sensing cycle may be determined by a summation of the magnitudes of the two sampled values. In other words, the user input during the sensing cycle is proportional to the difference between the two sampled values if the two sampled values are of opposite polarity. Those skilled in the art, having the benefit of this detailed description, will appreciate that there will be little to no change in the user input components of the resulting signal over a single sensing cycle. Thus any change deemed significant is likely a result of interference.

In STEP 511, the calculated interference value is compared with a noise threshold. If the interference value exceeds the noise threshold, this is indicative that interference was present during at least a part of the sensing cycle, and that the determined user input may be corrupted/distorted/invalid.

In STEP 513, a flag corresponding to the determined user input is issued. The flag may be issued in response to the interference value exceeding the noise threshold. Although not show in FIG. 5, the method may further comprise generating a comparison between a rail voltage(s) of the amplifier at least one of the first value and the second sampled value. The flag may also be issued in response to one or more sampled values approaching (i.e., within a tolerance of) a rail voltage of an amplifier in the circuit. The flag may be relied upon by other components (e.g., an analog-to-digital converter (ADC)) to ignore/discard the flagged demodulated user input and/or invoke one or more interference avoidance actions (e.g., modifying filtering operations).

Although the discussion of FIG. 5 has focused on a method for detecting interference in an input device implementing transcapacitance sensing, the input device may also implement absolute capacitance sensing or a hybrid of transcapacitance sensing and absolute capacitance sensing. In the embodiments involving only absolute capacitance sensing, there is no transmitter signal and thus STEP 501 may be omitted. Instead, in the embodiments involving absolute capacitance sensing, the receiver circuitry (205) may establish the drive signal. However, the output ($V_{ACC}$) of the accumulator circuitry (207) may still be used to generate an interference value for a sensing interval based on the two sample values collected during the sensing interval; and determine an input (i.e., user input) in the sensing region based on the two sample values collected during the sensing interval. Moreover, in the embodiments involving absolute capacitance sensing, a flag may still be issued when interference and/or voltage railing is detected.

Although embodiments of the invention have focused on voltage values (e.g., $V_{TH}$, $V_{ACC}$, etc.), those skilled in the art, having the benefit of this detailed description, will appreciated that interference values resulting from asymmetric noise/interference may also be calculated from sampled current (e.g., slew current) values.

Embodiments of the invention have on or more of the following advantages: the ability to estimate asymmetric noise/interference in a receiver channel; the ability to simultaneously sample both a user touch signal and asymmetric interference/noise in a receiver channel; the ability to flag a demodulated user input as invalid/corrupt due to asymmetric noise/interference; the ability to use slew detectors that detect slew conditions that have the property of incomplete settling at the end of the integration phase; the ability to use sensors with sensing frequencies that result in different relative settling times on different systems; independence from system conditions such as varying voltage level used to drive transmitter electrodes, touching objects that impact settling, and environmental conditions that impact the baseline capacitance between the transmitter sensor electrode(s) and the receiver sensor electrodes.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. A method for detecting interference in an input device, the method comprising:
  driving a transmitter signal onto a transmitter sensor electrode of the input device;
  receiving a resulting signal from a receiver sensor electrode of the input device;
  resetting accumulator circuitry associated with an amplifier at a start of a first half of a sensing cycle;
  sampling a first value associated with the resulting signal during the first half of the sensing cycle,
  wherein the accumulator circuitry accumulates the first value during the first half of the sensing cycle;
  resetting the accumulator circuitry at a start of a second half of the sensing cycle;
  sampling a second value associated with the resulting signal during the second half of the sensing cycle,
  wherein the accumulator circuitry accumulates the second value during the second half of the sensing cycle, and
  wherein the first value and the second value are each a different single voltage level;
  generating an interference value based on the first value and the second value;
  determining, based on the first value and the second value, an input in a sensing region of the input device;
  comparing the interference value to a noise threshold;
  generating a comparison between a rail voltage range of the amplifier and at least one selected from a group consisting of the first value and the second value; and
  issuing a first flag in response to the comparison.

2. The method of claim 1,
  wherein generating the interference value comprises subtracting the magnitudes of first value and the second value, and
  wherein determining the input comprises summing the magnitudes of the first value and the second value.

3. The method of claim 1, further comprising:
  issuing a second flag in response to the interference value exceeding the noise threshold.

4. The method of claim 3, further comprising:
  performing an interference avoidance action in response to the second flag.

5. The method of claim 1, wherein the interference value is indicative of asymmetric noise.

6. The method of claim 1, wherein generating the interference value further comprises:
  operatively connecting a first capacitor storing the first value and a second capacitor storing the second value.

7. The method of claim 1,
  wherein the first half cycle corresponds to at least one selected from a group consisting of a positive polarity and a negative polarity, and
  wherein the second half cycle has a polarity opposite the first half cycle.

8. The method of claim 1, wherein the first value and the second value are selected from a group consisting of current and voltage.

9. An input device configured to sense input objects in a sensing region, the input device comprising:
  transmitter circuitry configured to drive a transmitter signal onto a transmitter sensor electrode of the input device,
    wherein the transmitter signal comprises a transmitter waveform with repeating cycles, and
    wherein each cycle comprises a transition;
  receiver circuitry configured to receive a resulting signal from a receiver sensor electrode of the input device, the receiver circuitry comprising:
    accumulator circuitry comprising an amplifier and configured to:
      accumulate a first value of the resulting signal during a first half of a sensing cycle; and
      accumulate a second value of the resulting signal during a second half of the sensing cycle,
      wherein the first value and the second value are each a different single voltage level;
    demodulator circuitry configured to:
      determine an input from the sensing region of the input device based on the first value and the second value; and
      generate an interference value based on the first value and the second value; and
  control circuitry comprising a first comparator and a second comparator, the control circuitry configured to:
    generate, using the first comparator, a first comparison of the interference value and a noise threshold;

generate, using the second comparator, a second comparison between a rail voltage range of the amplifier and at least one of the first value and the second value; and issue a flag based on the second comparison.

10. The input device of claim 9,
wherein the interference value is generated by determining a difference in magnitudes of the first value and the second value, and
wherein the input is determined by a summation of the magnitudes of the first value and the second value.

11. The input device of claim 9, wherein the control circuitry is further configured to:
issue a flag for the input based on the first comparison.

12. The input device of claim 11, wherein the input device performs an interference avoidance action in response to the flag based on the first comparison.

13. The input device of claim 9, wherein the control circuitry further comprises an OR gate operatively connected to the first comparator and the second comparator, and wherein the OR gate outputs the flag.

14. The input device of claim 9, wherein the interference value is indicative of asymmetric noise.

15. The input device of claim 9, wherein the demodulator circuitry further comprises:
a first capacitor storing the first value and a second capacitor storing the second value.

16. The input device of claim 9,
wherein the first half cycle corresponds to at least one selected from a group consisting of a positive polarity and a negative polarity, and
wherein the second half cycle has a polarity opposite the first half cycle.

17. The input device of claim 9, wherein the first value and the second value are selected from a group consisting of current and voltage.

* * * * *